United States Patent
Grunwald et al.

(10) Patent No.: US 9,428,615 B2
(45) Date of Patent: Aug. 30, 2016

(54) SILICONE COMPOSITION WHICH CAN BE CROSSLINKED INTO ELASTOMERS AND WHICH COMPRISES CROSSLINKABLE POLYGLYCOL ETHERS

(71) Applicant: Wacker Chemie AG, Munich (DE)

(72) Inventors: Martin Grunwald, Emmerting (DE); Mathias Miedl, Polling (DE); Hans-Joerg Winter, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 274 days.

(21) Appl. No.: 14/362,776

(22) PCT Filed: Nov. 28, 2012

(86) PCT No.: PCT/EP2012/073807
§ 371 (c)(1),
(2) Date: Jun. 4, 2014

(87) PCT Pub. No.: WO2013/083453
PCT Pub. Date: Jun. 13, 2013

(65) Prior Publication Data
US 2014/0364565 A1    Dec. 11, 2014

(30) Foreign Application Priority Data

Dec. 9, 2011  (DE) .................. 10 2011 088 146

(51) Int. Cl.
| | |
|---|---|
| C08L 83/04 | (2006.01) |
| C08K 3/36 | (2006.01) |
| C08G 77/38 | (2006.01) |
| C08G 77/20 | (2006.01) |
| C08G 77/18 | (2006.01) |

(52) U.S. Cl.
CPC ............... *C08G 77/20* (2013.01); *C08G 77/18* (2013.01); *C08G 77/38* (2013.01); *C08K 3/36* (2013.01); *C08L 83/04* (2013.01)

(58) Field of Classification Search
CPC ......... C08L 83/04; C08K 3/36; C08G 77/20; C08G 77/18; C08G 77/38
USPC ....................... 524/847, 858; 528/32; 556/444
See application file for complete search history.

(56) References Cited

U.S. PATENT DOCUMENTS

| | | |
|---|---|---|
| 5,580,921 A | 12/1996 | Stepp et al. |
| 6,251,969 B1 | 6/2001 | Worner et al. |
| 6,251,990 B1 | 6/2001 | Meguriya et al. |
| 6,252,028 B1 | 6/2001 | Fehn et al. |
| 6,359,098 B1 | 3/2002 | Fehn et al. |
| 2008/0207825 A1 | 8/2008 | Stark |

FOREIGN PATENT DOCUMENTS

| | | |
|---|---|---|
| DE | 10020670 A1 * | 8/2001 |
| EP | 0602128 B1 | 6/1994 |
| EP | 0994159 A1 | 4/2000 |
| EP | 1006147 A1 | 6/2000 |
| EP | 1077226 A1 | 2/2001 |
| EP | 1922352 B1 | 5/2008 |
| GB | 802467 | 10/1958 |
| GB | 802467 A1 * | 10/1958 |
| WO | 93/04659 A1 | 3/1993 |
| WO | 2007/028740 A1 | 3/2007 |

* cited by examiner

*Primary Examiner* — Kelechi Egwim
(74) *Attorney, Agent, or Firm* — Brooks Kushman P.C.

(57) ABSTRACT

Silicone elastomers exhibiting high breakdown voltage and improved static decay characteristics are prepared from a crosslinkable silicone composition containing an ethylenically unsaturated polyoxyalkylene polyether which becomes chemically bonded into the elastomer during cure.

12 Claims, No Drawings

SILICONE COMPOSITION WHICH CAN BE CROSSLINKED INTO ELASTOMERS AND WHICH COMPRISES CROSSLINKABLE POLYGLYCOL ETHERS

CROSS-REFERENCE TO RELATED APPLICATIONS

This application is the U.S. National Phase of PCT Appln. No. PCT/EP2012/073807 filed Nov. 28, 2012, which claims priority to German application DE 10 2011 088 146.8 filed Dec. 9, 2011, the disclosures of which are incorporated in their entirety by reference herein.

BACKGROUND OF THE INVENTION

1. Field of the Invention

The invention relates to a silicone composition that can be crosslinked to give elastomers and that comprises polyglycol ethers which can be incorporated by crosslinking and which have at least one unsaturated group.

2. Description of the Related Art

In insulation materials such as silicone elastomers, electrical charges can arise through friction or in direct-voltage applications, and because of very high volume resistivities in the region of about 1015 Ω cm these can only be dissipated very slowly.

Any lowering of volume resistivity achieved with electrically conductive fillers such as carbon black, graphite, or metal powder has only low reproducibility and is therefore very unreliable. These additives moreover have an adverse effect on breakdown voltage.

U.S. Pat. No. 6,251,990 B1 describes addition-crosslinkable silicone rubber compositions for high-voltage insulators which comprise, as agents providing thixotropic properties, from 0.1 to 50 parts by weight of siloxane-polyether block copolymers per 100 parts by weight of siloxane comprising alkenyl groups. These compositions comprise large amounts of aluminum hydroxide (ATH) in order to improve electrical insulator properties. However, large amounts of aluminum hydroxide impair the mechanical properties of the silicone rubber.

DE 10020670 describes polyorganosiloxanes which have been modified with polyalkylene glycol moieties and which, because of the high content of more than 50% by weight of polyalkylene glycol moieties, are highly hydrophilic. These polyorganosiloxanes serve as additives in paints and other coating materials, and in polyurethane foams.

EP 1922352 describes the production of hydrophilic silicone organocopolymers by means of free-radical polymerization. The silicone organocopolymers comprise polyglycol ether moieties.

EP 602128 describes a polysiloxane composition which gives permanently water-wettable vulcanizates and for which a siloxane comprising polyglycol ether moieties and vinyl moieties is incorporated as modifier by crosslinking into the polysiloxane composition to provide hydrophilic properties. The polysiloxane composition is used as dental impression composition.

SUMMARY OF THE INVENTION

The invention provides a silicone composition (M) that can be crosslinked to give elastomers and that comprises polyglycol ether compounds (PE) which have at least one unsaturated group and which can be incorporated by crosslinking, and which comprise structural elements of the general formula I $$(O-(CH_2)_v)_w-O \qquad (I),$$

in which
v signifies the values 1, 2, 3, or 4, and
w signifies values from 2 to 50,
where the content of structural elements of the general formula I in the silicone composition (M) is from 0.001 to 0.067% by weight.

DETAILED DESCRIPTION OF THE PREFERRED EMBODIMENTS

Surprisingly, it has been found that silicone compositions (M) modified by a small content of polyglycol ether compounds (PE) that can be incorporated by crosslinking give, after crosslinking, silicone elastomers having volume resistivities of no more than from $10^{13}$ to $9 \cdot 10^{14}$ Ω·cm. The volume resistivity can be adjusted easily and as desired. The modified silicone elastomers are still excellent insulators, and by way of example when compared with unmodified silicone elastomers have almost the same high breakdown voltages. Surprisingly, despite the incorporation of a hydrophilic polyglycol ether compound (PE) by crosslinking, the contact angles Θ of a water droplet on the modified silicone elastomer decrease only slightly, as long as amounts of the polyglycol ether compound (PE) are small. The small amounts of the polyglycol ether compound (PE) have only a small effect on mechanical properties.

In order to avoid diffusion in the material which could lead to nonuniform behavior, it is essential that the polyglycol ether moieties have been incorporated by crosslinking.

The invention therefore also provides a process for lowering the volume resistivity of a silicone composition crosslinked to give elastomers, where the uncrosslinked silicone composition (M) is modified by polyglycol ether compounds (PE) which can be incorporated by crosslinking and which have at least one unsaturated group, and which comprise structural elements of the general formula I $$(O-(CH_2)_v)_w-O \qquad (I),$$

in which
v signifies the values 1, 2, 3, or 4, and
w signifies values from 2 to 50,
where the content of structural elements of the general formula I in the silicone composition (M) is from 0.001 to 0.067% by weight.

The content of structural elements of the general formula I in the silicone composition (M) is preferably from 0.005 to 0.033% by weight.

The invention therefore also likewise provides a silicone composition (M) that can be crosslinked to give elastomers and that comprises a content of polyglycol ether compounds (PE) which have at least one unsaturated group and which can be incorporated by crosslinking, and which comprise structural elements of the general formula I $$(O-(CH_2)_v)_w-O \qquad (I),$$

in which
v signifies the values 1, 2, 3, or 4, and
w signifies values from 2 to 50,
where said content is such that the volume resistivity is from $10^{13}$ to $9 \cdot 10^{14}$ Ω·cm.

The polyglcyol ether compounds (PE) have at least one unsaturated group which can be used to incorporate them by crosslinking into the silicone composition (M) by way of an addition reaction (hydrosilylation) with an SiH-functional compound.

v preferably signifies 2 or 3. w preferably signifies values from 3 to 20, in particular from 5 to 10.

The crosslinkable silicone composition (M) can be a peroxidically crosslinking or addition-crosslinking composition.

The silicone composition (M) which can be crosslinked to give elastomers preferably comprises the following constituents:

(A) 100 parts by weight of a polyorganosiloxane which comprises at least two alkenyl groups per molecule and which has a viscosity of from 0.1 to 500,000 Pa·s at 25° C.,
(B) from 1 to 200 parts by weight of filler,
(C) a crosslinking component which is selected from
(C1) an organic peroxide or
(C2) an organosilicon compound comprising at least two SiH functions per molecule in combination with a hydrosilylation catalyst (C3), and
(D) a polyglycol ether compound (PE) which can be incorporated by crosslinking and which comprise the structural elements of the general formula I described hereinabove, where the content of structural elements of the general formula I in the silicone composition (M) is from 0.01 to 0.5% by weight.

The composition of the polyorganosiloxane (A) comprising alkenyl groups preferably corresponds to the average general formula II

$$R^3_x R^4_y SiO_{(4-x-y)/2} \quad (II),$$

in which
$R^3$ signifies a monovalent $C_1$-$C_{10}$-hydrocarbon moiety which comprises aliphatic carbon-carbon multiple bonds,
$R^4$ signifies a monovalent $C_1$-$C_{10}$-hydrocarbon moiety which is free from aliphatic carbon-carbon multiple bonds,
x signifies a non-negative number such that at least two moieties $R^3$ are present in each molecule, and
y signifies a non-negative number such that (x+y) is in the range from 1.8 to 2.5.

The alkenyl groups $R^3$ are accessible to an addition reaction with an SiH-functional crosslinking agent. It is usual to use alkenyl groups having from 2 to 6 carbon atoms, for example vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

The moieties $R^3$ can be bonded in any position on the polymer chain, in particular at the terminal silicon atoms.

Examples of C1-C10-hydrocarbon moieties without aliphatic carbon-carbon multiple bond R4 are alkyl moieties such as the methyl, ethyl, n-propyl, isopropyl, n-butyl, isobutyl, tert-butyl, n-pentyl, isopentyl, neopentyl, and tert-pentyl moieties, hexyl moieties such as the n-hexyl moiety, heptyl moieties such as the n-heptyl moiety, octyl moieties such as the n-octyl moiety and isooctyl moieties such as the 2,2,4-trimethylpentyl moiety, nonyl moieties such as the n-nonyl moiety, decyl moieties such as the n-decyl moiety, dodecyl moieties such as the n-dodecyl moiety, and octadecyl moieties such as the n-octadecyl moiety, cycloalkyl moieties such as cyclopentyl, cyclohexyl, cycloheptyl and methylcyclohexyl moieties, aryl moieties such as the phenyl, naphthyl, anthryl and phenanthryl moieties, alkaryl moieties such as the o-, m-, p-tolyl moieties, xylyl moieties and ethylphenyl moieties, and aralkyl moieties such as the benzyl moiety, and the α- and the β-phenylethyl moieties. Preference is given to methyl, ethyl, and n-propyl moieties.

Examples of substituted moieties R4 are haloalkyl moieties such as the 3,3,3-trifluoro-n-propyl moiety, the 2,2,2,2',2',2'-hexafluoroisopropyl moiety, and the heptafluoroisopropyl moiety.

$R^4$ preferably has from 1 to 6 carbon atoms. Particular preference is given to methyl and phenyl.

Constituent (A) can also be a mixture of various polyorganosiloxanes which comprise alkenyl groups and which differ by way of example in alkenyl group content, in the nature of the alkenyl group, or structurally.

The structure of the polyorganosiloxanes (A) which comprise alkenyl groups can be linear, cyclic, or else branched. The content of tri- and/or tetrafunctional units leading to branched polyorganosiloxanes is typically very small, namely preferably at most 20 mol %, in particular at most 0.1 mol %.

It is preferable that (x+y) is from 1.9 to 2.2.

Particular preference is given to the use of polydimethylsiloxanes which comprise vinyl groups and molecules of which correspond to the general formula III

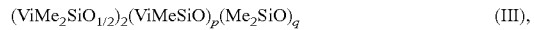

$$(ViMe_2SiO_{1/2})_2(ViMeSiO)_p(Me_2SiO)_q \quad (III),$$

where the non-negative integers p and q comply with the following relationships: p≥0, 50<(p+q)<20 000, preferably 200<(p+q)<1000, and 0<(p+1)/(p+q)<0.2.

The viscosity of the polyorganosiloxane (A) at 25° C. is preferably from 0.05 to 100,000 Pa·s, in particular from 1 to 15,000 Pa·s.

Examples of non-reinforcing fillers (B) are mineral or organic fillers, such as quartz, for example in the form of quartz powder, talc powder, diatomaceous earth, clays, chalk, lithopones, carbon blacks, graphite, metal oxides, metal carbonates, metal sulfates, metal salts of carboxylic acids, metal dusts, fibers, such as glass fibers, synthetic fibers, plastics powders. The fillers (B) can also have been surface-treated, e.g. with silylating agent.

Examples of reinforcing fillers (B) are fumed or precipitated silicas, and also aluminum hydroxide (ATH), preference being given here to fumed and precipitated silicas.

It is preferable that the silicone compositions (M) comprise preferably from 10 to 150 parts by weight of filler (B), in particular from 20 to 50 parts by weight.

The reinforcing fillers mentioned can have hydrophilic character or can have been hydrophobized by known processes. When hydrophilic fillers are incorporated it is necessary to add a hydrophibizing agent.

It is preferable that the mineral reinforcing filler (B) has a BET surface area of at least 50 m²/g, in particular at least 100 m²/g, in accordance with DIN EN ISO 9277.

It is preferable that the silicone compositions (M) comprise at most 100 parts by weight of aluminum hydroxide, in particular at most 50 parts by weight of aluminum hydroxide.

The silicone compositions (M) can comprise organic peroxide (C1) as crosslinking component (C). Use of organic peroxide (C1), where these serve as source of free radicals, brings about free-radical crosslinking of the silicone compositions. Examples of organic peroxides (C1) are acyl peroxides, such as dibenzoyl peroxide, bis(4-chlorobenzoyl)peroxide, bis(2,4-dichlorobenzoyl)peroxide and bis(4-methylbenzoyl)peroxide; alkyl peroxides and aryl peroxides, such as di-tert-butyl peroxide, 2,5-bis(tert-butylperoxy)-2,5-dimethylhexane, dicumyl peroxide, and 1,3-bis(tert-butylperoxyisopropyl)benzene; perketals, such as 1,1-bis(tert-butylperoxy)-3,3,5-trimethylcyclohexane; peresters, such as dicetyl peroxy-dicarbonate, tert-butyl perbenzoate, tert-butylperoxy isopropyl carbonate, tert-butylperoxy isononanoate, dicyclohexylperoxy dicarbonate, and 2,5-dimethylhexane-2,5-diperbenzoate, tert-butyl β-hydroxyethyl peroxide. It is also possible to use a combination of organic peroxides (C1), for example bis-4-methylbenzoyl peroxide and a single compound or at least two of the compounds from the group consisting of benzoyl peroxide, dicumyl peroxide, 2,5-dimethylhexane-2,5-diperbenzoate, and di-tert-butyl peroxide.

In the case of peroxidic crosslinking, the silicone compositions (M) preferably comprise from 0.01 to 10 parts by weight of organic peroxide (C1), in particular from 0.1 to 0.5 parts by weight.

In the case of platinum-catalyzed hydrosilylation, it is preferable that the composition of the organosilicon compound (C2) comprising at least two SiH functions per molecule corresponds to the average general formula IV $$H_r R^6_s SiO_{(4-m-n)/2}$$ (IV), in which
$R^5$ is a monovalent $C_1$-$C_{10}$-hydrocarbon moiety which is free from aliphatic carbon-carbon multiple bonds and
r and s are non-negative integers,
with the proviso that $0.5<(r+s)<3.0$ and $0<r<2$, and that there are at least two silicon-bonded hydrogen atoms present per molecule.

Examples of $R^5$ are the moieties stated for $R^4$. $R^5$ preferably has from 1 to 6 carbon atoms. Particular preference is given to methyl and phenyl.

It is preferable to use an organosilicon compound (C2) which comprises three or more SiH bonds per molecule. If an organosilicon compound (C2) which comprises only two SiH bonds per molecule is used it is advisable to use a polyorganosiloxane (A) which has at least three alkenyl groups per molecule.

The hydrogen content of the organosilicon compound (C2), based exclusively on the hydrogen atoms directly bonded to silicon atoms, is preferably in the range from 0.002 to 1.7% by weight of hydrogen, more preferably from 0.1 to 1.7% by weight of hydrogen.

The organosilicon compound (C2) preferably comprises at least three silicon atoms per molecule and at most 600. It is preferable to use organosilicon compounds (C2) which comprise from 4 to 250 silicon atoms per molecule.

The structure of the organosilicon compound (C2) can be linear, branched, cyclic, or network-like.

Particularly preferred organosilicon compounds (C2) are linear polyorganosiloxanes of the general formula V $$(HR^6_2 SiO_{1/2})_k (R^6_3 SiO_{1/2})_l (HR^6 SiO_{2/2})_o (R^6_2 SiO_{2/2})_t$$ (V), where
$R^6$ has the meanings of $R^5$, and
the non-negative integers k, l, o, and t comply with the following relationships: (k+l)=2, (k+o)>2, 5<(o+t)<200 and $1<o/(o+t)<0.1$.

The amount of the SiH-functional organosilicon compound (C2) present in the crosslinkable silicone composition is preferably such that the molar ratio of SiH groups to alkenyl groups is from 0.5 to 5, in particular from 1.0 to 3.0.

The hydrosilylation catalyst (C3) can comprise any catalysts which catalyze hydrosilylation reactions that proceed during the crosslinking of addition-crosslinking silicone compositions. Particular hydrosilylation catalysts (C3) that can be used are metals and compounds of these, for example platinum, rhodium, palladium, ruthenium, and iridium, preferably platinum. It is preferable to use platinum and platinum compounds. Particular preference is given to those platinum compounds that are soluble in polyorganosiloxanes. Examples of soluble platinum compounds that can be used are the platinum-olefin complexes of the formulae $(PtCl_2.olefin)_2$ and $H(PtCl_3.olefin)$, and preference is given here to the use of alkenes having from 2 to 8 carbon atoms, e.g. ethylene, propylene, isomers of butene and of octane, or cycloalkenes having from 5 to 7 carbon atoms, e.g. cyclopentene, cyclohexene, and cyclo-heptene. Other soluble platinum catalysts are the platinum-cyclopropane complex of the formula $(PtCl_2C_3H_6)_2$, the reaction products of hexachloroplatinic acid with alcohols, with ethers, and with aldehydes and, respectively, mixtures of the same, and the reaction product of hexachloroplatinic acid with methylvinylcyclotetrasiloxane in the presence of sodium bicarbonate in ethanolic solution. Particular preference is given to complexes of platinum with vinylsiloxanes, such as symdivinyltetramethyldisiloxane. The platinum compounds described in EP-A-1077226 and EP-A-994159 are likewise very suitable.

Hydrosilylation catalyst (C3) can be used in any desired form including by way of example the form of microcapsules comprising hydrosilylation catalyst, or of organopolysiloxane particles, as described in EP-A-1006147.

The content of hydrosilylation catalysts (C3) is selected in such a way that the Pt content of the addition-crosslinkable silicone composition is from 0.1-200 ppm, preferably from 0.5-40 ppm.

It is preferable that the polyglycol ether compounds (PE) which can be incorporated by crosslinking have the general formula VI $$[R_3 SiO_{1/2}]_a [R^1 R_2 SiO_{1/2}]_b [ZR_2 SiO_{1/2}]_c [ZRR^1 SiO_{1/2}]_d$$
$$[RR^1 SiO_{2/2}]_e [R_2 SiO_{2/2}]_f [SiO_{4/2}]_g [RSiO_{3/2}]_h$$
$$[R^1 SiO_{3/2}]_i$$ (VI)

in which the moieties
R signify hydrogen atoms or identical or different monovalent, unsubstituted or halogen-substituted $C_1$-$C_{12}$-hydrocarbon moieties bonded by way of SiC, where at least one of the moieties R has an aliphatic double bond,
$R^1$ signifies the general formula VII $$E[OY]_x R^2$$ (VII)

in which
E signifies a single bond or a $C_1$-$C_6$-alkylene moiety,
Y signifies identical or different $C_1$-$C_4$-alkylene moieties,
$R^2$ signifies a hydroxy group, a $C_1$-$C_{100}$-hydrocarbonoxy or $C_1$-$C_6$-oxycarbonylalkyl moiety, or siloxane moiety,
x has the values 1 to 20, and
Z has the meanings of $R^2$ or signifies a halogen atom,
with the proviso that a, b, c, and d have, respectively, mutually independently, values from 0 to 8, the sum a+b+c+d is from 2 to 8, the sum a+b+c+d+e+f+g+h+i is from 10 to 400, and the ratio of the sums a+c+f+g+h:b+d+e+i is from 100:1 to 1:1.

It is preferable that the moieties R do not signify hydrogen atoms. Examples of unsubstituted moieties R without aliphatic double bond have been listed above under $R^4$.

The above moieties R optionally comprise an aliphatic double bond. Examples are alkenyl moieties, such as the vinyl, allyl, 5-hexen-1-yl, E-4-hexen-1-yl, Z-4-hexen-1-yl, 2-(3-cyclohexenyl)ethyl, and cyclododeca-4,8-dienyl moiety.

Examples of halogen-substituted $C_1$-$C_{12}$-hydrocarbon moieties R are alkyl moieties substituted by fluorine atoms, chlorine atoms, bromine atoms, and iodine atoms, for example the 3,3,3-trifluoro-n-propyl moiety, the 2,2,2,2',2', 2'-hexafluoroisopropyl moiety, the heptafluoroisopropyl moiety, and haloaryl moieties, such as the o-, m-, and p-chlorophenyl moiety.

Preferred moieties R without aliphatic double bonds are the methyl and phenyl moiety. Preferred moieties R having aliphatic double bonds are the vinyl, allyl and 5-hexen-1-yl moiety.

The alkylene moieties Y are divalent straight-chain or branched-chain alkyl moieties which have been bonded by way of two bonds to carbon atoms of the alkyl moiety into the polyglycol ether compounds (PE) which can be incorporated by crosslinking.

The $C_1$-$C_{100}$-hydrocarbonoxy moieties $R^2$ are straight-chain or branched-chain hydrocarbon moieties bonded by way of an oxygen atom, and are in particular $C_1$-$C_{10}$-alkyl moieties. The oxycarbonylalkyl moieties are carboxylic acid moieties having a straight-chain or branched-chain alkyl moiety. The above examples of alkyl moieties are also relevant to the alkylene, alkoxy, and oxycarbonylalkyl moieties explained above. Preferred alkylene, alkoxy, and oxycarbonylalkyl moieties have from 1 to 3 carbon atoms.

The siloxane moiety $R^2$ can be straight-chain or branched. It is preferable that the siloxane moiety $R^2$ comprises from 2 to 15 siloxane units. It is preferable that the siloxane moiety $R^2$ comprises monovalent, unsubstituted or halogen-substituted $C_1$-$C_{12}$-hydrocarbon moieties bonded by way of SiC, and it is also possible here that at least one of the moieties R has an aliphatic double bond.

Large values of f and small values of e and x improve the miscibility of silicone composition (M) and polyglycol ether compounds (PE). The preferred polyglycol ether compounds (PE) have good miscibility with components (A) and (C).

It is preferable that the ratio a+c+f+g+h:x(b+d+e+i) is from 60:40 to 90:10. It is preferable that values of x are from 3 to 10.

The miscibility of the polyglycol ether compounds (PE) with the silicone composition (M) is particularly good when there is relatively little branching of the siloxane structure of the polyglycol ether compounds, i.e. f>0.8(f+g+h+i) and e>0.6(d+e+i), b, c, d, g, h and i<0.2(a+b+c+d+e+f+g+h+i), in particular <0.1(a+b+c+d+e+f+g+h+i) and when preferably more than half of the terminal groups in the siloxane structure exclusively bear moieties R, i.e. a>0.5(a+b+c+d), in particular a>0.6(a+b+c+d).

The polyglycol ether compounds (PE) have good processability, i.e. can be mixed rapidly and homogeneously with the polysiloxane composition (M), when the sum a+b+c+d+e+f+g+h+i is from 10 to 400, preferably from 10 to 220, in particular from 20 to 160.

By virtue of the production process, the polyglycol ether compounds (PE) often comprise small amounts of moieties Z which signify a hydroxy group. When the polyglycol ether compounds (PE) have Si—H groups or are mixed into a component (C) comprising Si—H groups, c+d must be <0.02(a+b+c+d+e+f+g+h+i), in order to minimize hydrogen evolution which impairs shelf life. The hydrolyzable groups Z are preferably present in less than 10% of the siloxane units, i.e. c+d<0.1 (a+b+c+d+e+f+g+h+i).

It is preferable that the polyglycol ether compounds (PE) are produced by the process described in EP 602128. The polyglycol ether compounds (PE) are then free from noble metal catalyst.

It is preferable that the silicone composition (M) is used to produce elastomers and moldings for electrical insulation, in particular for direct current.

All of the above symbols in the above formulae have their respective meanings independently of one another. The silicon atom is tetravalent in all formulae.

Unless otherwise stated, all of the quantitative and percentage data in the examples below are based on weight, all of the pressures are 0.10 MPa (abs.), and all of the temperatures are 20° C.

EXAMPLE 1

RTV2

Production of Component 1

26 parts of a hydrophobic fumed silica with a specific surface area of 130 m²/g are admixed in a laboratory mixer with 29 parts of a vinyldimethylsiloxy-terminated polydimethylsiloxane with a viscosity of 1000 mPa s, and the mixture is heated to 180° C. for 90 minutes, with stirring. A total of 29 parts of a hydrodimethylsiloxy-terminated polydimethylsiloxane with a viscosity of 1000 mPa s are then added stepwise (25° C.)

The following are then admixed with the resultant composition: 14 parts of hydrodimethylsiloxy-terminated polydimethylsiloxane with a viscosity of 1000 mPa s (25° C.), 4 parts of vinyldimethylsiloxy-terminated polydimethylsiloxane with a viscosity of 1000 mPa s, and 1.7 parts of an Si—H crosslinking agent composed of dimethylsiloxy, trimethylsiloxy, and methylhydrosiloxy groups, the H content of the Si—H crosslinking agent being 0.17% by weight.

Production of Component 2

32 parts of a hydrophobic fumed silica with a specific surface area of 130 m²/g are admixed in a laboratory mixer with 35 parts of a vinyldimethylsiloxy-terminated polydimethylsiloxane with a viscosity of 1000 mPa s, and the mixture is heated to 180° C. for 90 minutes, with stirring. A total of 32 parts of vinyldimethylsiloxy-terminated polydimethylsiloxane with a viscosity of 1000 mPa s are then added stepwise.

The following are admixed with 12 parts of this composition: a further 26 parts of a vinyldimethylsiloxy-terminated polydimethylsiloxane with a viscosity of 1000 mPa s, 45 parts of a vinyldimethylsiloxy-terminated polydimethylsiloxane with a viscosity of 200 mPa s, a platinum catalyst for the hydrosilylation (100 ppm of Pt, based on the metal), and 0.7 part of 1,1,3,3-tetramethyl-1,3-divinyldisiloxane.

Components 1 and 2 are mixed in the ratio 9:1 and then polyglycol ether compounds (PE) of the formula $[H_2C=CH-SiMe_2O_{1/2}]_{1.88}[SiMe_2OiPr]_{0.12}[SiMe_2O_{2/2}]_{44}[SiR'MeO_{2/2}]_{7.5}$, where $R'=(CH_2)_3(OC_2H_4)_4O_{Me}$, produced by the process of EP 602128 B1, page 8, line 44 to page 9, line 13 are admixed in an amount such that the content stated in table 1 is achieved. The mixture is then mixed at room temperature for 5 minutes with the aid of a laboratory stirrer.

The room-temperature-crosslinkable mixture is then crosslinked for 10 minutes at 100° C.

In the case of the mixtures f,g,h,i, 2 more parts of the same Si—H crosslinking agent are also added, in addition to the 1.7 parts, to component 1.

EXAMPLE 2

LSR

Production of Component 3

30 parts of a hydrophobic fumed silica with a specific surface area of 300 m²/g are admixed in a laboratory mixer with 65 parts of a vinyldimethylsiloxy-terminated polydimethylsiloxane with a viscosity of 20,000 mPa s, and the mixture is heated to 180° C. for 90 minutes, with stirring. The following are admixed with the mixture after cooling: 4.5 parts of an Si—H crosslinking agent composed of dimethylsiloxy, trimethylsiloxy, and methylhydrosiloxy groups, the H content of the Si—H crosslinking agent being 0.48% by weight, and an inhibitor batch comprising 0.12 part of ethynylcyclohexanol.

Production of Component 4

30 parts of a hydrophobic fumed silica with a specific surface area of 300 m2/g are admixed in a laboratory mixer with 66 parts of a vinyldimethylsiloxy-terminated polydimethylsiloxane with a viscosity of 20,000 mPa s, and the mixture is heated to 180° C. for 90 minutes, with stirring. A platinum catalyst (20 ppm of Pt, based on the metal) for the hydrosilylation is then admixed with the resultant mixture.

Components 3 and 4 are mixed in the ratio 1:1, and then polyglycol ether compound (PE) of example 1 is admixed in an amount such that the content stated in table 2 is achieved. The mixture is then mixed at room temperature for 5 minutes with the aid of a laboratory stirrer.

The mixture is then crosslinked at 165° C. for 5 minutes.

EXAMPLE 3

HTV

Production of Component 5

34 parts of a vinyldimethylsiloxy-terminated polydimethylsiloxane with a molar mass of about 500,000 g/mol are mixed in a kneader with 5 parts of a hydrophilic silica with a surface area of 150 $m^2/g$ (WACKER HDK® V15) and 7 parts of a hydrophobic silica with a surface area of 300 $g/m^2$, 54 parts of aluminum trihydroxide (ATH, Martinal OL-104/S, Martinswerk GmbH, DE) and 3 parts of an α-ωOH-functional polydimethylsiloxane with a viscosity of 50 mPa s. The following are then admixed with the resultant mixture: 1 part of a paste comprising 45% of 2,5-bis(tert-butylperoxy)-2,5-dimethylhexane in silicone oil, and polyglycol ether compound (PE) of example 1, in an amount such that the content stated in table 3 is achieved. The mixture is then crosslinked at 165° C. for 15 minutes.

The contact angle Θ of a water droplet on the silicone elastomer test specimen is measured as a measure of the level of hydrophobic properties 3 minutes after application of the droplet.

Volume resistivity is measured in accordance with IEC 60093. Specific dielectric strength is measured on a 1 mm sheet by a method based on IEC 60243.

TABLE 1 example 1

| Mixture | a* | b | c | d | e | f | g* | h* | i* |
|---|---|---|---|---|---|---|---|---|---|
| Content of polyglycol ether compound (PE)[%] | 0* | 0.25 | 0.5 | 0.75 | 1.0 | 2.0 | 3.0* | 4.0* | 5.0* |
| Content of structural element (O—($CH_2$)$_2$)$_4$—O) [%] | 0* | 0.008 | 0.017 | 0.025 | 0.033 | 0.067 | 0.100* | 0.133* | 0.167* |
| Shore A hardness | 27 | 29 | 29 | 30 | 29 | | | | |
| Ultimate tensile strength [N/$mm^2$] | 6.7 | 6.1 | 6.0 | 5.4 | 5.7 | | | | |
| Elongation at break [%] | 612 | 590 | 608 | 562 | 618 | | | | |
| Tear resistance [N/mm] | 28.9 | 20.9 | 20.1 | 20.4 | 20.9 | | | | |
| Rebound [%] | 57 | 51 | 50 | 50 | 46 | | | | |
| Volume resistivity [Ω cm] | 3.19 $10^{15}$ | 4.43 $10^{14}$ | 5.21 $10^{13}$ | 2.08 $10^{13}$ | 1.45 $10^{13}$ | 9.10 $10^{12}$ | 5.42 $10^{12}$ | 2.83 $10^{12}$ | 1.09 $10^{12}$ |
| Dielectric strength [kV/mm] | 29 | 27 | 26 | 26 | 24 | 24 | 24 | 24 | 23 |
| Contact angle after 3 min [°] | 106 | 104 | 103 | 101 | 99 | 90 | 69 | 58 | 44 |

*not of the invention

TABLE 2 example 2

| Mixture | a* | b | c | d | e |
|---|---|---|---|---|---|
| Content of polyglycol ether compound (PE) [%] | 0* | 0.25 | 0.5 | 0.75 | 1.0 |
| Content of structural element (O—($CH_2$)$_2$)$_4$—O) [%] | 0* | 0.008 | 0.017 | 0.025 | 0.033 |
| Shore A hardness | 50 | 51 | 51 | 51 | 52 |
| Ultimate tensile strength [N/$mm^2$] | 8.5 | 7.9 | 8.2 | 8.9 | 8.4 |
| Elongation at break [%] | 490 | 477 | 500 | 518 | 530 |
| Tear resistance [N/mm] | 22.5 | 21.7 | 21.7 | 21.8 | 21.6 |
| Rebound [%] | 56 | 56 | 54 | 54 | 53 |
| Volume resistivity [Ω cm] | 1.05 $10^{15}$ | 8.41 $10^{14}$ | 4.22 $10^{14}$ | 1.26 $10^{14}$ | 7.60 $10^{13}$ |
| Dielectric strength [kV/mm] | 24 | 23 | 26 | 25 | 24 |

*not of the invention

TABLE 3

| Mixture | a* | b | c | d | e |
|---|---|---|---|---|---|
| Content of polyglycol ether compound (PE) [%] | 0* | 0.25 | 0.5 | 0.75 | 1.0 |
| Content of structural element (O—(CH$_2$)$_2$)$_4$—O) [%] | 0* | 0.008 | 0.017 | 0.025 | 0.033 |
| Shore A hardness | 73 | 71 | 70 | 68 | 65 |
| Ultimate tensile strength [N/mm$^2$] | 6.8 | 6.2 | 6.0 | 5.6 | 5.1 |
| Elongation at break [%] | 204 | 217 | 268 | 292 | 335 |
| Tear resistance [N/mm] | 12.7 | 13.2 | 14.1 | 14.8 | 14.8 |
| Rebound [%] | 42 | 41 | 39 | 38 | 36 |
| Volume resistivity [Ω cm] | 4.98 10$^{14}$ | 2.00 10$^{14}$ | 9.68 10$^{13}$ | 4.00 10$^{13}$ | 1.68 10$^{13}$ |
| Dielectric strength [kV/mm] | 23 | 23 | 22 | 22 | 23 |

*not of the invention

The test results in tables 1 to 3 show that volume resistance decreases measureably with increasing concentration of the polyglycol ether compound (PE) incorporated by crosslinking, even when concentrations are very small, whereas the level of breakdown voltage remains constant over a wide range. Although the polyglycol ether compound (PE) is a polar molecule with hydrophilic character, volume resistivity decreases in accordance with the concentration of the polyglycol ether compound (PE), but at these small concentrations there is no significant adverse effect, within the bounds of accuracy of measurement, on important parameters such as dielectric strength and level of hydrophobic properties (measured via the contact angle).

A significant decrease in the contact angle is recorded only when concentrations of the compound PE are above 2%.

What is claimed is:

1. A crosslinkable silicone composition (M) that can be crosslinked to give elastomers, comprising at least one polyglycol ether compound (PE) which has at least one unsaturated group and which can be incorporated by crosslinking, and which comprises structural elements of the formula I $$(O—(CH_2)_v)_w—O \qquad (I),$$

in which
v is 1, 2, 3, or 4, and
w is from 2 to 50,
where the content of structural elements of the formula I in the silicone composition (M) is from 0.001 to 0.067% by weight.

2. The crosslinkable silicone composition (M) of claim 1, wherein the crosslinkable silicone composition (M) is a peroxidically crosslinking or addition-crosslinking composition.

3. The crosslinkable silicone composition (M) of claim 1, wherein the silicone composition (M) which can be crosslinked to give elastomers comprises the following constituents:

(A) 100 parts by weight of a polyorganosiloxane which comprises at least two alkenyl groups per molecule and which has a viscosity of from 0.1 to 500,000 Pa·s at 25° C., (B) from 1 to 200 parts by weight of fillers, (C) a crosslinking component which is selected from
(C1) an organic peroxide or
(C2) an organosilicon compound comprising at least two SiH functions per molecule in combination with a hydrosilylation catalyst (C3), and (D) a polyglycol ether compound (PE) which can be incorporated into the elastomer by crosslinking, where the content of structural elements of the general formula I in the silicone composition (M) is from 0.001 to 0.067% by weight.

4. The crosslinkable silicone composition (M) of claim 1, wherein the silicone composition (M) comprises reinforcing filler(s) (B) with a BET surface area of at least 50 m$^2$/g in accordance with DIN EN ISO 9277.

5. The crosslinkable silicone composition (M) of claim 1, wherein the polyglycol ether compound(s) (PE) which can be incorporated by crosslinking have the formula VI $$[R_3SiO_{1/2}]_a[R^1R_2SiO_{1/2}]_b[ZR_2SiO_{1/2}]_c[ZRR^1SiO_{1/2}]_d$$
$$[RR^1SiO_{2/2}]_e[R_2SiO_{2/2}]_f[SiO_{4/2}]_g[RSiO_{3/2}]_h$$
$$[R^1SiO_{3/2}]_i \qquad (VI)$$

wherein
R individually are hydrogen or identical or different monovalent, unsubstituted or halogen-substituted Si—C-bonded C$_1$-C$_{12}$-hydrocarbon moieties, where at least one of the moieties R has an aliphatic double bond,
R$^1$ corresponds to the formula VII $$E[OY]_xR^2 \qquad (VII)$$

wherein
E is a single bond or a C$_1$-C$_6$-alkylene moiety,
Y are identical or different C$_1$-C$_4$-alkylene moieties,
R$^2$ is a hydroxy group, a C$_1$-C$_{100}$-hydrocarbonoxy or C$_1$-C$_6$-oxycarbonylalkyl moiety, or siloxane moiety,
x is 1 to 20, and
Z has the meanings of R$^2$ or is a halogen atom,
with the proviso that a, b, c, and d have, respectively mutually independently, values from 0 to 8, the sum a+b+c+d is from 2 to 8, the sum a+b+c+d+e+f+g+h+i is from 10 to 400, and the ratio of the sums a+c+f+g+h:b+d+e+i is from 100:1 to 1:1.

6. An electrical insulator, comprising a crosslinked elastomer composition of claim 1.

7. A process for lowering the volume resistivity of a silicone composition crosslinked to an elastomer, comprising adding to the uncrosslinked silicone composition (M), at least one polyglycol ether compound (PE) which can be incorporated into the silicone by crosslinking and which has at least one unsaturated group, and which comprise structural elements of the formula I $$(O-(CH_2)_v)_w-O \qquad (I),$$

in which
v is 1, 2, 3, or 4, and
w is from 2 to 50,
where the content of structural elements of the formula I in the silicone composition (M) is from 0.001 to 0.067% by weight.

8. The process of claim 7, wherein the crosslinkable silicone composition (M) is a peroxidically crosslinking or addition-crosslinking composition.

9. The process of claim 7, wherein the silicone composition (M) which can be crosslinked to give elastomers comprises the following constituents:
(A) 100 parts by weight of a polyorganosiloxane which comprises at least two alkenyl groups per molecule and which has a viscosity of from 0.1 to 500,000 Pa·s at 25° C.,
(B) from 1 to 200 parts by weight of fillers,
(C) a crosslinking component which is selected from
(C1) an organic peroxide or
(C2) an organosilicon compound comprising at least two SiH functions per molecule in combination with a hydrosilylation catalyst (C3), and
(D) a polyglycol ether compound (PE) which can be incorporated into the elastomer by crosslinking,
where the content of structural elements of the general formula I in the silicone composition (M) is from 0.001 to 0.067% by weight.

10. The process of claim 7, wherein the silicone composition (M) comprises reinforcing filler(s) (B) with a BET surface area of at least 50 m$^2$/g in accordance with DIN EN ISO 9277.

11. The process of claim 7, wherein the polyglycol ether compound(s) (PE) which can be incorporated by crosslinking have the formula VI $$[R_3SiO_{1/2}]_a[R^1R_2SiO_{1/2}]_b[ZR_2SiO_{1/2}]_c[ZRR^1SiO_{1/2}]_d$$
$$[RR^1SiO_{2/2}]_e[R_2SiO_{2/2}]_f[SiO_{4/2}]_g[RSiO_{3/2}]_h$$
$$[R^1SiO_{3/2}]_i \qquad (VI)$$

wherein
R individually are hydrogen or identical or different monovalent, unsubstituted or halogen-substituted Si—C-bonded $C_1$-$C_{12}$-hydrocarbon moieties, where at least one of the moieties R has an aliphatic double bond,
$R^1$ corresponds to the formula VII $$E[OY]_xR^2 \qquad (VII)$$

wherein
E is a single bond or a $C_1$-$C_6$-alkylene moiety,
Y are identical or different $C_1$-$C_4$-alkylene moieties,
$R^2$ is a hydroxy group, a $C_1$-$C_{100}$-hydrocarbonoxy or $C_1$-$C_6$-oxycarbonylalkyl moiety, or siloxane moiety,
x is 1 to 20, and
Z has the meanings of $R^2$ or is a halogen atom,
with the proviso that a, b, c, and d have, respectively mutually independently, values from 0 to 8, the sum a+b+c+d is from 2 to 8, the sum a+b+c+d+e+f+g+h+i is from 10 to 400, and the ratio of the sums a+c+f+g+h:b+d+e+i is from 100:1 to 1:1.

12. An electrical insulator, comprising a crosslinked elastomer composition prepared by the process of claim 7.

* * * * *